United States Patent Office 3,734,878
Patented May 22, 1973

3,734,878
NON-BLOCKING ETHYLENE COPOLYMER COMPOSITION
Werner Claus von Dohlen, Charleston, W. Va., and Harvey Lionel Batleman, Somerville, N.J., assignors to Union Carbide Corporation, New York, N.Y.
No Drawing. Filed Oct. 5, 1971, Ser. No. 186,774
Int. Cl. C08f 45/44
U.S. Cl. 260—32.6 PQ
20 Claims

ABSTRACT OF THE DISCLOSURE

Copolymers of ethylene with an acrylyl acid or salt thereof or a vinyl acylate or an alkyl acrylyl ester or an N-alkyl-N-vinyl acylamide are treated with an N,N'-di-n-alkyl terephthalamide to improve the blocking and slip characteristics of films produced therewith.

BRIEF DESCRIPTION

In the instant invention a small, minor amount of an N,N'-di-n-alkyl terephthalamide is added to certain copolymers of ethylene to improve the slip and block characteristics of the copolymers. The use of additives to improve the slip and block characteristics of polyethylene has been carried out in the past. However, the prior art has not disclosed the invention herein described in which an N,N'-di-n-alkyl terephthalamide compound is added to ethylene copolymers. In fact, there is to our knowledge no reference in the prior art relating to or disclosing the use of these N,N'-di-n-alkyl terephthalamide compounds in any polymer composition for the purpose herein stated.

DETAILED DISCLOSURE

An important use of copolymers of ethylene with an acrylyl acid or the ionomer salts thereof, and of copolymers of ethylene with a vinyl acylate, and of copolymers of ethylene with an alkyl acrylyl ester, and of copolymers of ethylene with an N-alkyl-N-vinyl acylamide is in the production of self-supporting films that are useful as coating or wrapping materials. A disadvantage of such films is that the film layers tend to stick to each other during storage and handling, making high speed processing in production and use difficult. It has been found that during storage or production the films often tend to adhere to each other, resulting in damage to the film itself. Similar problems are also known to exist with the homopolymer of ethylene and have been solved to some extent as evidenced by the disclosures found in U.S. 2,938,879, U.S. 2,956,035, U.S. 3,330,796. These patents are only a few of the many patents and publications in the field dealing with this problem and are merely illustrative of what has been done to alleviate the problem with polyethylene itself.

Poor slip, which is the tendency of film not to slide over the surface of another layer of the film, is a problem that plagues the industry. It interferes greatly with the automatic handling equipment and results in delays caused by upsets in the operation of, for example, a heat sealer, bag maker, bag loader or filler, bag opener, overwrap packager, and the like. The coefficient of friction gives an indiction of the slip characteristics of a film with a high coefficient of friction being undesirable and indicative of poor slip properties.

Blocking is the tendency of the film to resist separation by a separating force applied perpendicular to the film and results in poor handling during production and use. This is another physical factor of importance in the film art.

It has now been found that the addition of N,N'-di-n-alkyl terephthalamide compounds to poly(vinyl chloride) and to certain ethylene copolymers will improve the slip and block properties of the copolymer films. The ethylene copolymers with which this invention is concerned are the copolymers of ethylene with up to 15 weight percent of an acrylyl acid or the ionomer salts thereof, the copolymers of ethylene with up to 35 weight percent of a vinyl acylate, the copolymers of ethylene with up to 35 weight percent of an alkyl acrylyl ester, and the copolymers of ethylene with up to 35 weight percent of an N-alkyl-N-vinyl acylamide. Any of such film forming solid copolymers can be used and they can have a melt index of from 0.05 to 50 dgm./min.

In this specification the term acrylyl acid or salts thereof means acrylic acid or methacrylic acid or the ionomer salts thereof such as the metal salts, ammonium salts, amine salts, and the like. The term vinyl acylate means a vinyl ester of the formula:

in which R' is hydrogen or an alkyl group having up to six carbon atoms, such as vinyl formate, vinyl acetate, vinyl propionate, vinyl butyrate, vinyl hexoate, and the like. The term alkyl acrylyl ester means a compound of the formula:

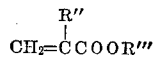

in which R" is hydrogen or methyl and R''' is an alkyl group having up to 10 carbon atoms, such as methyl acrylate, methyl methacrylate, ethyl acrylate, ethyl methacrylate butyl acrylate, hexyl acrylate, neopentyl acrylate, amyl methacrylate, 2-ethylhexyl acrylate, 5-ethyl-2-nonyl acrylate, decyl acrylate, decyl methacrylate, and the like. The term N-alkyl-N-vinyl acylamide means a compound of the formula

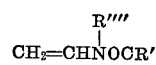

in which R'''' is an alkyl group having up to 3 carbon atoms and R' is a hydrogen atom or an alkyl group having up to six carbon atoms, such as N-methyl-N-vinyl formamide, N-methyl-N- vinyl acetamide, N-ethyl-N-vinyl acetamide, N-propyl-N-vinyl acetamide, N-isopropyl-N-vinyl acetamide, N - methyl - N - vinyl propionamide, N-methyl-N-vinyl butyramide, N-ethyl-N-vinyl caproylamide, and the like.

The N,N'-di-n-alkyl terephthalamide compounds that are added to the ethylene copolymers are any of the symmetrical or unsymmetrical compounds of the formula:

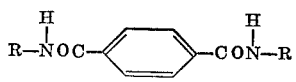

wherein R is an n-alkyl group having from 1 to 24 carbon atoms, preferably at least 4 carbon atoms. Illustrative thereof, one can mention N,N'-di-methyl terephthalamide, N,N'-di-ethyl terephthalamide, N,N'-di-n-propyl terephthalamide, N,N'-di-n-butyl terephthalamide ,N,N'-di-n-hexyl terephthalamide, N,N'-di-n-octyl terephthalamide, N,N'-di-n-didecyl terephthalamide, N,N'-di-n-dihendecyl terephthalamide, N,N'-di-n-dodecyl terephthalamide, N,N'-di-n-tetradecyl terephthalamide, N,N'-di-n-heptadecyl terephthalamide, N,N'-di-n-eicosyl terephthalamide, N,N'-di-docosyl terephthalamide, N,N'-di-n-tricosyl terephthalamide, N,N'-di-n-tetracosyl terephthalamide, and the like.

The N,N'-di-n-alkyl terephthalamide compound is added at a concentration of about 0.005 to about 2 weight percent of the composition; preferably from about 0.01 to about 0.5 weight percent thereof. The addition of the N,N'-di-n-alkyl terephthalamide compound to the above described ethylene copolymers can be carried out by any of the conventional procedures known in the art. The blending can be by a solution technique using a known solvent, by milling above or below the fluxing temperature of the polymer, or by dispersion methods. These procedures are so well known in the art that they do not require further explanation here.

The N,N'-di-n-alkyl terephthalamide compounds are prepared by known methods. One such method involves treating a toluene solution of terephthaloyl chloride with pyridine to give the pyridinium complex and then adding an excess of the desired amine compound to the mixture while stirring and cooling. At the completion of the addition of all reactants, the reaction mixture is heated to about 50 to 75° C. for a period of time and then the N,N'-di-n-alkyl terephthalamide compound is recovered and purified by conventional means. The N,N'-di-n-alkyl terephthalamides used in the examples of this specification are prepared by this procedure. These compounds are generally solids.

The composition of this invention can also contain therein any of the conventional pigments, dyes, and fillers such as carbon black, titanium dioxide, diatomaceous earth, calcium silicate and others known to the art. Any of the conventional antioxidants, such as aromatic amines and hindered phenols, commercially used with olefin polymers and copolymers can be also included if desired. The compositions can also contain small amounts of the slip or non-blocking agents known to be useful for polyethylene compositions, such as stearyl erucamide. Several of these are disclosed in the patents previously referred to and they can be used in conjunction with the compounds now found useful.

In addition to the N,N'-di-n-alkyl terephthalamide compounds, it has also been found that one can use a small amount of an N,N'-di-n-alkyl sulfonamide of the formula RSONHR to improve the slip and block properties of ethylene and ethylene copolymer films. These compounds can be added to the polymers in the same amounts and in the same manner as heretofore disclosed. Illustrative thereof one can mention N,N'-di-n-methyl stearyl sulfonamide, N,N'-di-n-propyl palmityl sulfonamide, N,N'-di-n-ethyl arachidyl sulfonamide, N,N'-di-n-ethyl lauryl sulfonamide, and the like.

The following examples further serve to illustrate the invention.

EXAMPLE 1

A solid copolymer of ethylene and acrylic acid, having a 7 weight percent acrylic acid content and a melt index of 7 dgm./min. (ASTM Test D-1238), was blended with 400 p.p.m. of 2,6-di-tertiary-butyl-para-cresol as the antioxidant in a Banbury mixer until the temperature of the blend reached 75° C. At that time 0.2 weight percent of Super Floss silica and 0.2 weight percent of N,N'di-n-hexyl terephthalamide were added and the batch was mixed until the flux temperature was reached. The blend was fluxed for another two minutes, extruded and diced.

A film was produced by the conventional tubular extrusion process using a two inch diameter die and an extrusion temperature of 330° F. It was blown to produce a six inch layflat tubular film that was 1.5 mils thick.

For comparative purposes two other blends were prepared and films were produced from them following the same procedures described above. One of these blends contained the antioxidant as the sole additive (Control A) and the other blend contained both the antioxidant and the silica (Control B).

The coefficient of friction, which is a measure of the slip properties, and the blocking properties were determined on all of the ethylene/acrylic acid (EAA) copolymer films. The results are reported in Table I. It will be observed that the film produced from the blend containing the N,N'-di-n-hexyl terephthalamide exhibited considerably lower coefficient of friction, normal blocking and induced blocking values than either of the controls.

TABLE I

|  | Example 1 | Control A | Control B |
|---|---|---|---|
| EAA copolymer, percent | 99.56 | 99.96 | 99.76 |
| DHTP,[1] percent | 0.20 | | |
| Silica, percent | 0.20 | | 0.20 |
| Antioxidant, percent | 0.04 | 0.04 | 0.04 |
| Coefficient of friction: [2] | | | |
| Inside-Inside [3] | 0.43 | >1 | >1 |
| Outside-Outside [4] | 0.28 | >1 | >1 |
| Normal blocking, gm.[5] | 82 | 129 | 250 |
| Induced blocking, gm.: [6] | | | |
| Inside-Inside | 84 | >250 | >250 |
| Outside-Outside | 29 | 203 | >250 |

[1] DHTP is N,N'-di-n-hexyl terephthalamide.
[2] Coefficient of friction was determined by the procedure in ASTM Test D-1894, Procedure B.
[3] Inside-Inside means that the inside surfaces of the tubular films were in contact.
[4] Outside-Outside means that the outside surfaces of the tubular films were in contact.
[5] Normal blocking was determined by the procedure in ASTM Test D-1983.
[6] Induced blocking was determined by the procedure in ASTM Test D-1893 on six inch wide film samples conditioned for 24 hours at 140° F. and a dead weight of 0.14 p.s.i.g.

Example 2

Following the procedures described in Example 1, tubular film was produced from a blend of 99.56 weight percent of a solid copolymer of ethylene and acrylic acid having a 15 weight percent acrylic acid content and a melt index of 5 dgm./min., 0.2 weight percent of N,N'-di-n-hexyl terephthalamide, 0.2 weight percent of Super Floss silica and 0.04 weight percent of 2,6-di-tertiary-butyl-para-cresol as antioxidant. Controls were also prepared for comparison purposes as described in Example I. The results reported in Table II show the improvements in co-efficient of friction and blocking values resulting by the addition of N,N'-di-n-hexyl terephthalamide to the copolymer film.

TABLE II

|  | Example 2 | Control A | Control B |
|---|---|---|---|
| EAA copolymer, percent | 99.56 | 99.96 | 99.76 |
| DHTP, percent | 0.20 | | |
| Silica, percent | 0.20 | | 0.20 |
| Antioxidant, percent | 0.04 | 0.04 | 0.04 |
| Coefficient of friction: | | | |
| Inside-Inside | 0.50 | >1 | >1 |
| Outside-Outside | 0.32 | >1 | 0.44 |
| Normal blocking, gm | 135 | >250 | >250 |
| Induced blocking, gm.: | | | |
| Inside-Inside | 116 | >250 | >250 |
| Outside-Outside | 43 | >250 | >250 |

Similar results are obtained by the substitution of the sodium ionomer salt copolymer.

Example 3

Following the procedures described in Example 1, tubular film was produced from a blend of 99.56 weight percent of a solid copolymer of ethylene and vinyl acetate having a 3.5 weight percent vinyl acetate content and a melt index of 0.9 dgm./min., 0.2 weight percent of N,N'-di-n-hexyl terephthalamide, 0.2 weight percent of Super Floss silica and 0.04 weight percent of 2,6-di-tertiary-butyl-para cresol as antioxidant. Controls were also prepared for comparison purposes, as described in Example 1.

The results reported in Table III show the improvements in coefficient of friction and blocking values resulting by the addition of N,N'-di-n-hexyl terephthalamide to the ethylene/vinyl acetate (EVA) copolymer film. Particularly unexpected and surprising are the low blocking values observed by the use of the compounds of this class, this was a completely unobvious finding.

TABLE III

|  | Example 3 | Control A | Control B |
|---|---|---|---|
| EVA copolymer, percent | 99.56 | 99.96 | 99.76 |
| DHTP, percent | 0.20 | | |
| Silicia, percent | 0.20 | | 0.20 |
| Antioxidant, percent | 0.04 | 0.04 | 0.04 |
| Coefficient of friction: | | | |
| Inside-Inside | 0.47 | >1 | 0.65 |
| Outside-Outside | 0.32 | 0.60 | 0.51 |
| Normal blocking, gm | 5 | 125 | 105 |
| Induced blocking, gm.: | | | |
| Inside-Inside | 0 | 230 | 210 |
| Outside-Outside | 0 | 146 | 48 |

Similar results are obtained when the copolymer used to prepare the blend is a copolymer of ethylene and ethyl acrylate having a 6 weight percent ethyl acrylate content, or a copolymer of ethylene and N-methyl-N-vinyl acetamide having a 5 weight percent N-methyl-N-vinyl acetamide content, and wherein the other additives are present in the same amounts stated in Example 3.

Important considerations in films are the effect an additive may have on the adhesion of inks or other coatings to the film surface and also the effect the additive may have on the coefficient of friction and blocking values of film surfaces that have been treated to improve such adhesion, for example treatment of the film surface by corona discharge. In order to show the unexpected and unobvious improvements obtained by the instant invention, films were prepared from blends containing varying amounts of N,N'-di-n-hexyl terephthalamide and stearyl erucamide and compared to a film containing stearyl erucamide only. The blends and the films therefrom were prepared as described in Example 1. The films were then treated with a corona discharge at different treatment levels by the conventional manner well known to those skilled in this art. The blocking and coefficient of friction values were measured on the films; in addition the adhesion of a commercially available red printing ink (Flexotuf Red E-80885) to the treated films was determined.

The improved performance that the addition of N,N'-di-n-hexyl terephthalamide contributes to an ethylene/acrylic acid copolymer film having a 4 weight percent acrylic acid content and melt index of 7 dgm./min. and containing one of the most efficient commercially available additives, stearyl erucamide, is shown in the results reported in Table IV. Run A shows that the minimum concentration of stearyl erucamide required to achieve a 24 hour coefficient of friction value of 0.2 or less after subjecting the film to corona discharge treatment is a concentration of 0.2 percent or 2,000 p.p.m. Runs B, C and D show that the same low values can be obtained when a lower total concentration of a mixture of N,N'-di-n-hexyl terephthalamide and stearyl erucamide is used. In Runs B, C and D only 1,000 p.p.m. of stearyl erucamide are required when used together with 500, 350 or 200 p.p.m. of N,N'-di-n-hexyl terephthalamide, respectively. The unmodified film, containing no stearyl erucamide or N,N'-di-n-hexyl terephthalamide, shows extremely high blocking tendencies and very bad slip properties after it has been subjected to corona discharge treatment. Film produced containing N,N'-di-n-hexyl terephthalamide but no stearyl erucamide possesses good blocking and slip properties after it has been subjected to the corona discharge treatment; but these properties are better when both additives are present.

It was found that without any N,N'-di-n-hexyl terephthalamide, Run A, a corona discharge power level of 1.8 watts/ft.²/min. was required to obtain acceptable ink adhesion. At that power level, however, blocking was adversely affected and the film displayed an excessive blocking force of 181 grams. Runs B and C illustrate that the addition of 500 p.p.m. or 350 p.p.m. of N,N'-di-n-hexyl terephthalamide to the copolymer blend produced excellent ink adhesion at 1.6 watts/ft.²/min. with good blocking values of only 30 and 42 grams, respectively, while still maintaining coefficient of friction values similar to those of Run A. Run D, containing only 200 p.p.m. of N,N'-di-n-hexyl terephthalamide, required only 1.2 watts/ft.²/min. for excellent ink adhesion and the film still had good blocking values and coefficient of friction values similar to those of Run A.

This data is reported in Table IV, wherein it is further shown that the untreated films from Runs B, C and D that have not been corona discharge treated have better blocking properties than the film from Run A that has not been corona discharge treated.

TABLE IV

| Run | A | B | C | D |
|---|---|---|---|---|
| EAA copolymer, percent | 99.65 | 99.70 | 99.715 | 99.73 |
| Stearyl erucamide, percent | 0.20 | 0.10 | 0.100 | 0.10 |
| DHTP, percent | 0 | 0.05 | 0.035 | 0.02 |
| Silica, percent | 0.10 | 0.10 | 0.100 | 0.10 |
| Antioxidant, percent | 0.05 | 0.05 | 0.050 | 0.05 |
| Ink adhesion after subjecting film to treatment of— | | | | |
| 1.2 watts/ft.²/min | (1) | (1) | (2) | Exc. |
| 1.4 watts/ft.²/min | (1) | (1) | (3) | Exc. |
| 1.6 watts/ft.²/min | (3) | Exc. | Exc. | Exc. |
| 1.8 watts/ft.²/min | Exc. | Exc. | Exc. | Exc. |
| 2.3 watts/ft.²/min | Exc. | Exc. | Exc. | Exc. |
| Blocking of treated surfaces in grams after subjecting film to treatment of— | | | | |
| 1.2 watts/ft.²/min | | | | 60 |
| 1.4 watts/ft.²/min | | | | 62 |
| 1.6 watts/ft.²/min | 150 | 30 | 42 | 78 |
| 1.8 watts/ft./min | 181 | 32 | 42 | 81 |
| 2.3 watts/ft.²/min | 250+ | 35 | 42 | 80 |
| Blocking of untreated surfaces in grams | 80 | 27 | 32 | 43 |
| 24-hour coefficient of friction of treated surface after subjecting film to treatment of— | | | | |
| 1.2 watts/ft.²/min | | | | 0.22 |
| 1.6 watts/ft.²/min | 0.18 | 0.20 | 0.19 | 0.17 |
| 1.8 watts/ft.²/min | 0.18 | 0.20 | 0.21 | 1.19 |
| 2.3 watts/ft.²/min | 0.17 | 0.20 | 0.21 | 0.18 |

¹ Poor.
² Good.
³ Very good.

Example 4

Films 1.5 mils thick were produced from a blend of a copolymer of ethylene and acrylic acid having a 4 weight percent acrylic acid content and a melt index of 3.4 dgm./min. The films all contained 1,000 p.p.m. of inert silica and 100 p.p.m. of 2,6-di-tertiary-butyl-paracresol as the antioxidant. The copolymers also contained the amounts of conventional slip agent or N,N'-di-n-alkyl terephthalamide indicated in Table V. The results show the great general improvements in coefficient of friction and internal blocking obtained by the use of the dialkyl terephthalamides as compared to the conventional erucamide compounds used in the past or in the absence of any slip additive whatsoever, particularly in blocking properties. Similar results are obtained with copolymers of ethylene and ethyl acrylate.

The internal blocking value is a measure of the force required to separate two surfaces of polyethylene tubing. Samples of tubing, four inches by five inches are carefully cut from the tubing, the folded edges are not part of the cut samples. The cut sample is mounted between the plates of a testing apparatus. The plates, each four inches by four inches, are supported independently of each other. The lower plate is firmly fastened to the base, the upper plate is supported by a 30 inch cross arm attached at about the midpoint to a fulcrum, at the other end of the arm there is suspended a holding pan. The cut sample is mounted between the two plates so that the long end extends over one side and is purposely opened and each film layer is separately taped to the upper and lower plates, respectively. A weight is adjusted on the cross arm to balance the apparatus before the cut sample is placed in position. Balance is considered affected when the upper and lower plates are barely touching or within 0.003 inch. After the cut sample has been mounted, water is slowly added from a buret to a beaker on the pan. When the tubing begins to separate from the front edge, the rate of the addition of the water is carefully controlled to 1.5 grams per minute. The internal blocking value is the total weight of the beaker and added water when the upper plate and lower plate have just separated completely. Film samples that give internal blocking values below 20 grams are considered non-blocking. Film samples that give internal blocking values of 100 grams or higher are considered to be blocked and difficult to handle. Those that give internal blocking values between 20 grams and 100 grams are intermediate in handling properties and their use often presents handling problems. The values reported in Table V show that the N,N-dialkyl terephthalamides are excellent for reducing internal blocking.

TABLE V

| Slip additive | Conc., percent | Coefficient of friction | | | Internal blocking, gms. | | |
|---|---|---|---|---|---|---|---|
| | | Immediately | 1 day | 14 days | 1 day | 14 days | 30 days |
| None | 0 | >1 | >1 | >1 | >250 | >250 | >250 |
| Erucamide | 0.2 | >1 | 0.6 | 0.5 | >250 | >250 | >250 |
| Stearyl erucamide | 0.2 | 0.5 | 0.32 | 0.2 | 200 | 150 | |
| Dibutyl terephthalamide | 0.15 | 0.26 | 0.22 | | 0 | 0 | |
| Dihexyl terephthalamide | 0.2 | 0.24 | 0.24 | 0.20 | 0 | 0 | |
| Dioctyl terephthalamide | 0.2 | 0.26 | 0.26 | | 0 | 0 | |
| Distearyl terephthalamide | 0.2 | 0.47 | 0.44 | 0.4 | 0 | 0 | |

Example 5

One and one-half mils thick film was produced from an ethylene/vinyl acetate copolymer having a 16 weight percent vinyl acetate content and a melt index of 2.5 dgm./min. The copolymer contained 2,000 p.p.m. inert silica, 500 p.p.m. of 2,6-di-tertiary-butyl-para-cresol as the antioxidant and 0.2 weight percent of N,N'-di-n-hexyl terephthalamide. A control film was produced in the same manner omitting the N,N'-di-n-hexyl terephthalamide. The blocking values of the films are recorded below; the great improvement in these properties of the films of this invention is clearly evident.

| Film sample | Example 5 | Control |
|---|---|---|
| Normal blocking, gms | 67 | >250 |
| Internal blocking, gms | 87 | >250 |

It has also been found that the N,N'-di-n-alkyl terephthalamides can be added to poly(vinyl chloride) to improve the coefficient of friction and blocking properties of poly(vinyl chloride) films. Thus, the use of poly(vinyl chloride) in place of ethylene/vinyl acetate copolymer in the composition of Example 5 gives poly(vinyl chloride) films of improved properties.

What is claimed is:

1. A composition comprising (A) a normally solid copolymer from the group of (a) copolymers of ethylene with up to 15 weight percent of acrylyl acid or salts thereof, (b) copolymers of ethylene with up to 35 weight percent of a vinyl acylate wherein the acylate group has up to 7 carbon atoms, (c) copolymers of ethylene with up to 35 weight percent of an alkyl acrylyl ester wherein the alkyl group has up to 10 carbon atoms, (d) copolymers of ethylene with up to 35 weight percent of an N-alkyl-N-vinyl acylamide wherein the alkyl group has up to 3 carbon atoms and the acyl group can have up to 7 carbon atoms, or (e) poly(vinyl chloride), and (B) from 0.005 weight percent to 2 weight percent of N,N'-di-n-alkyl terephthalamide wherein the alkyl group thereof has from 1 to 24 carbon atoms, said composition being characterized by lower coefficient of friction and lower blocking values than the unmodified solid copolymer.

2. A composition as claimed in claim 1, wherein the concentration of N,N'-di-n-alkyl terephthalamide is from 0.01 weight percent to 0.5 weight percent.

3. A composition as claimed in claim 1, wherein the normally solid polymer is a copolymer of ethylene and acrylic acid or methacrylic acid.

4. A composition as claimed in claim 1, wherein the normally solid polymer is a copolymer of ethylene and a vinyl acylate.

5. A composition as claimed in claim 1, wherein the normally solid polymer is a copolymer of ethylene and vinyl acetate.

6. A composition as claimed in claim 1, wherein the normally solid polymer is a copolymer of ethylene and an alkyl acrylate or alkyl methacrylate.

7. A composition as claimed in claim 1, wherein the normally solid polymer is a copolymer of ethylene and ethyl acrylate.

8. A composition as claimed in claim 1, wherein the normally solid polymer is a copolymer of ethylene and an N-alkyl-N-vinyl acylamide.

9. A composition as claimed in claim 1, wherein the N,N'-di-n-alkyl terephthalamide is N,N'-di-n-hexyl terephthalamide.

10. A composition as claimed in claim 1, wherein the N,N'-di-n-alkyl terephthalamide is N,N'-di-n-butyl terephthalamide.

11. A composition as claimed in claim 1, wherein the N,N'-di-n-alkyl terephthalamide is N,N'-di-n-octyl terephthalamide.

12. A composition as claimed in claim 1, wherein the N,N'-di-n-alkyl terephthalamide is N,N'-di-n-stearyl terephthalamide.

13. A self-sustaining ethylene polymer film of the composition of claim 1.

14. A self-sustaining ethylene polymer film of the composition of claim 2.

15. A self-sustaining ethylene polymer film of the composition of claim 3.

16. A self-sustaining ethylene polymer film of the composition of claim 5.

17. A self-sustaining ethylene polymer film of the composition of claim 7.

18. A self-sustaining ethylene copolymer film of the composition of claim 1, wherein said copolymer is the copolymer of ethylene and acrylic acid and said N,N'-di-n-alkyl terephthalamide is N,N'-di-n-hexyl terephthalamide.

19. A self-sustaining ethylene copolymer film of the composition of claim 1, wherein said copolymer is the copolymer of ethylene and vinyl acetate and said N,N'-di-n-alkyl terephthalamide is N,N'-di-n-hexyl terephthalamide.

20. A self-sustaining ethylene copolymer film of the composition of claim 1, wherein said copolymer is the copolymer of ethylene and ethyl acrylate and said N,N'-di-n-alkyl terephthalamide is N,N'-di-n-hexyl terephthalamide.

References Cited
UNITED STATES PATENTS

| | | | |
|---|---|---|---|
| 3,330,796 | 7/1967 | Mock et al. | 260—32.6 PQ |
| 3,396,137 | 8/1968 | Wharton | 260—32.6 R |
| 3,515,754 | 6/1970 | Mod et al. | 260—32.6 R |
| 3,647,738 | 3/1972 | Foster | 260—32.6 R |
| 3,371,057 | 2/1968 | Guttman | 260—32.6 PQ |
| 3,021,296 | 2/1962 | Ammondson | 260—32.6 PQ |

MORRIS LIEBMAN, Primary Examiner

P. N. THOMAS, Jr., Assistant Examiner

U.S. Cl. X.R.

260—32.6 R, 558 A